United States Patent [19]

Okumura

[11] Patent Number: 4,850,677
[45] Date of Patent: Jul. 25, 1989

[54] LIQUID CRYSTAL DISPLAY DEVICE HAVING IMPROVED ELECTRODES FOR A MULTI-TONE IMAGE

[75] Inventor: Fujio Okumura, Tokyo, Japan

[73] Assignee: NEC Corporation, Tokyo, Japan

[21] Appl. No.: 169,811

[22] Filed: Mar. 18, 1988

[30] Foreign Application Priority Data

Mar. 18, 1987 [JP] Japan .................................. 62-63402

[51] Int. Cl.⁴ ......................... G02F 1/133; G09G 3/36
[52] U.S. Cl. ..................................... 350/333; 350/336; 340/784
[58] Field of Search ................. 350/333, 336; 340/784

[56] References Cited

U.S. PATENT DOCUMENTS

| | | | |
|---|---|---|---|
| 4,035,060 | 7/1977 | Tsunoda et al. | 350/336 |
| 4,180,813 | 12/1979 | Yoneda | 350/333 |
| 4,642,628 | 2/1987 | Murata | 340/784 |
| 4,653,862 | 3/1987 | Morozumi | 350/333 |
| 4,709,993 | 12/1987 | Matsuyama et al. | 350/333 |
| 4,709,995 | 12/1987 | Kuribayashi et al. | 350/333 |
| 4,712,874 | 12/1987 | Sekimura et al. | 350/339 |
| 4,722,593 | 2/1988 | Shimazaki | 350/336 |
| 4,742,346 | 5/1988 | Gillette et al. | 340/784 |
| 4,775,891 | 10/1988 | Aoki et al. | 340/784 |

FOREIGN PATENT DOCUMENTS 0113030  5/1986  Japan .............................. 350/339 F

OTHER PUBLICATIONS

Submicrosecond bistable electro-optic switching in liquid crystals Noel A. Clark and Sven T. Lagerwill, Authors Appl. Phys. Lett. Jun. 1, 1980 (pp. 899 to 901).

Primary Examiner—Stanley D. Miller
Assistant Examiner—Anita E. Pellman
Attorney, Agent, or Firm—Helfgott & Karas

[57] ABSTRACT

The disclosed liquid crystal display device is composed of a transparent substrate and a plurality of pixels formed on the substrate, each pixel having a vertical electrode, a plurality of horizontal electrodes and liquid crystal interposed between the vertical and horizontal electrodes, and the horizontal electrodes in each pixel having different areas from each other. Ferroelectric liquid crystal is favorably used for the interposed liquid crystal.

7 Claims, 3 Drawing Sheets

4,850,677

LIQUID CRYSTAL DISPLAY DEVICE HAVING IMPROVED ELECTRODES FOR A MULTI-TONE IMAGE

BACKGROUND OF THE INVENTION (1) Field of the Invention

This invention relates to a liquid crystal display device, and more specifically, to an improvement of electrodes for displaying a multi-tone image.

(2) Description of the Related Art

Ferroelectric liquid crystals have a very short reorientation response time in comparison with twisted-nematic type liquid crystal which is widely used in display devices, and have been reported by Noel A. Clark and Sven T. Lagerwall in "Applied Physics Letters" vol. 36 No. 11 (June 1, 1980), pp. 899 to 901. The ferroelectric liquid crystals have another advantage of a memory function that an optical state changed by an application of electric field is remained after a removal of the electric field. A viewing angle of a display using the ferroelectric liquid crystal is wide.

Those features of ferroelectric liquid crystals allow an achievement of manufacturing a liquid crystal display which keeps a high image quality with increased number of pixels. An image having a high contrast, a high definition and a wide area is easily obtained without using thin-film transistor switches which are used in active-matrix type display devices.

The ferroelectric liquid crystal, however, has a drawback that a multi-tone image cannot be displayed by controlling magnitude of electric field applied to the ferroelectric liquid crystal. Unless such drawback is improved, the ferroelectric liquid crystal cannot be used for TV display. The application of ferroelectric liquid crystal to a plane display is proposed in U.S. Pat. No. 4,367,924, but the displayed image has only black or white.

SUMMARY OF THE INVENTION

It is an object of the present invention to provide a liquid crystal display device which may display a multi-tone image with a high speed reorientation response.

The liquid crystal display device of the present invention includes a plurality of pixels formed on a transparent substrate, each of pixels having a first electrode, a plurality of second electrodes having respectively different areas to each other and liquid crystal interposed between the first electrode and the second electrodes. Favorably, the areas of the second electrodes are selected to be about a half of the area of the pixel, about a fourth thereof, about an eighth thereof ... and about $\frac{1}{2}^n$ thereof (n being a number of the second electrodes). Ferroelectric liquid crystal is selected as the liquid crystal for achieving a high speed reorientation response to obtain a quick change of displayed image. The pixels are arranged in a matrix form by using a plurality of first electrodes elongated in parallel with each other, and a plurality of sets of second electrodes elongated in parallel with each other to perpendicularly cross the plurality of first electrodes.

According to the present invention, the tone of picture element can be controlled by selecting the second electrodes. If a voltage orientating the liquid crystal to a transparent state is applied to all the second electrodes in one pixel, the pixel shows a white state in response to application of scanning signal to the first electrode in the pixel. By controlling the total area of the second electrodes to which the orientating voltage is applied, the tone of the picture element may be changed. Thus, a multi-tone image can be be displayed without controlling transparency of liquid crystal.

The multi-tone image can be displayed with using ferroelectric liquid crystal which cannot control degree of transparency by applied voltage. Since the ferroelectric liquid crystal has a short reorientation response time, an image is quickly displayed from an application of the orientating voltage. In other words, the image can be quickly changed to display a moving picture, resulted in a possibility of application of the liquid crystal display device of the present invention to a TV display.

BRIEF DESCRIPTION OF THE DRAWINGS

The above and other objects, features and advantages of the present invention will become more apparent from the description taken in conjunction with the accompanying drawings, wherein.

DESCRIPTION OF THE PREFERRED EMBODIMENTS

A first embodiment of the present invention has a plurality of vertical scanning electrodes and a plurality of horizontal scanning sets of electrodes disposed so as to perpendicularly cross the vertical scanning electrodes. For facilitating understanding the invention, the structure of the first embodiment only has nine pixels with three vertical scanning electrodes 7 and three horizontal scanning sets 9 of electrodes 4, 5 and 6.

Figure 1:
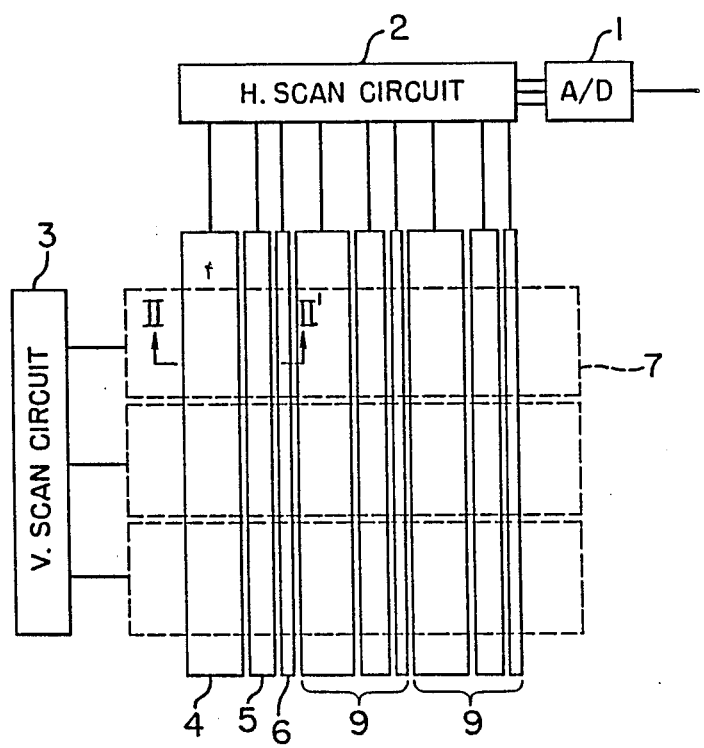
FIG. 1 is a brief plane view of a liquid crystal display device according to a first embodiment of the present invention.
Figure 2:
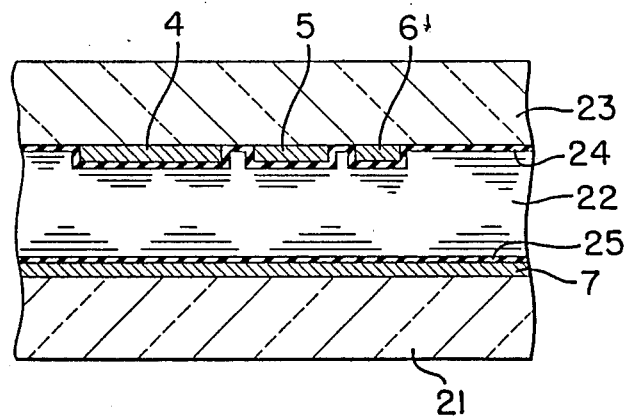
FIG. 2 is a sectional view taken along II—II' of FIG. 1.

The vertical scanning electrodes 7 are formed on a support substrate 21 of glass, as shown in FIG. 2, with a transparent conductive material such as indium tin oxide (ITO) having a thickness of 0.3 to 0.5 μm. Each of the vertical scanning electrodes has a width of 300 to 500 μm. One example of the width is 380 μm. The horizontal scanning sets 9 of electrodes 4, 5 and 6 formed on a bottom surface of a cover substrate 23 of glass with ITO. Each set 9 is designed to have the same width in total as the vertical scanning electrodes 7. The width of the widest electrode 4 is about a half ($\frac{1}{2}$) of the width of the set 9, and is 200 μm, for example. The width of the electrode 5 is about a fourth ($\frac{1}{2}^2$) of the width of the set 9, and is 100 μm, for example. The width of the narrowest electrode 6 is about an eighth ($\frac{1}{2}^3$) of width of the set 9, and is 50 μm, for example. Orientation films 24 and 25 of polyimide cover the surface of the glass substrates 21 and 23.

Ferroelectric liquid crystal is interposed between the support substrate 21 having the vertical scanning electrodes 7 and the cover substrate 23 having the horizontal scanning set 9 of electrodes 4, 5 and 6, through orientation films 24 and 25 of polyimide processed by a rubbing treatment. The orientations of the orientation films 24 and 25 cross at a right angle. Examples of ferroelectric liquid crystal are 4-(2′methylbutyl)phenyl-4′-n-alkoxybenzoate, 4-(2-methylbutyl)benzoate ester of 4-n-alkoxybenzoic acids, 2-methylbutyl-4′-n-alkoxybiphenyl-4-n-carboxylates, 4-n-alcanoyloxy-4′-(2″-methylbutyloxy)biphenyl, 4-(3″-methylpentanoyloxy)-4′-n-octyloxybiphenyl and 4-(2″-chlorobutanoyloxy)-4′-n-alkoxybiphenyl. A thickness of the ferroelectric liquid crystal is 2 $\mu$m at portions between the vertical scanning electrodes 7 and the electrodes 4, 5 and 6 of the horizontal scanning sets 9.

The vertical scanning electrodes 7 are usually biased by a voltage of $-10$ volts. A vertical scanning signal of 0 volt or $-20$ volts is sequentially applied to the vertical scanning electrodes 7 from a vertical scanning circuit 3. At a white state writing field, a pulse of $-20$ volts is applied to the scanned vertical scanning electrode 7. At a black state writing field, a pulse of 0 volt is applied to the scanned electrode 7. The white and black states are written by two fields. Each pulse is 100 $\mu$sec.

Figure 3:
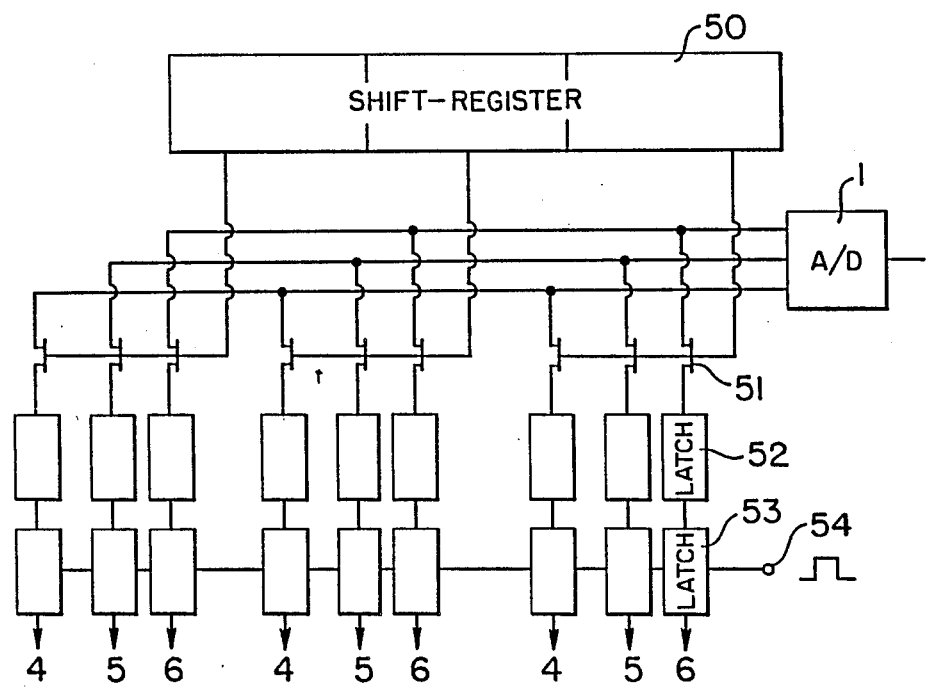
FIG. 3 is a block diagram showing a horizontal scanning circuit 2 and an A/D converter 1 of FIG. 1.

Referring to FIG. 3, a horizontal scanning circuit 2 includes a shift register 50, switching transistor 51, first latches 52 and second latches 53. Analog video signal is converted to a digital signal of three-bit binary code by an A/D converter 1. The three-bit binary code signal is first latched by a set of three first latches 52 by turning on a set of three switching transistors 51 in response to an output from the shift-register 50. In accordance with subsequent outputs from the shift-register 50, successive three-bit binary code signals are latched by other set of three first latches 52. Thereafter, all the signals latched in the first latches 52 are transferred to the second latches 53 in response to a timing pulse applied to the terminal 54 and then applied to the electrodes 4, 5 and 6 of the horizontal scanning sets 9. Usually, a bias voltage of $-10$ volts is applied to the electrodes 4, 5 and 6. The white state is written by applying a pulse of 0 volt to the electrodes 4, 5 and 6. The black state is written by applying a pulse of $-20$ volts to the electrodes 4, 5 and 6. The white and black states are written by two scanning fields. Each pulse has a pulse width of 100 $\mu$sec.

Figure 4A:
FIGS. 4(a) to 4(h) schematically show states of transparent part in one pixel, respectively.
Figure 4E:
Figure 4B:
Figure 4F:
Figure 4C:
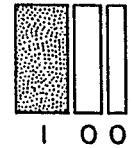
Figure 4G:
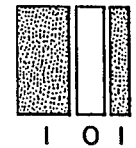
Figure 4D:
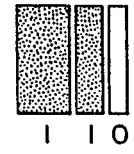
Figure 4H:

Since the widths of the electrodes 4, 5 and 6 are respectively designed to be about a half, about a fourth and about an eighth of the total width, that is $\frac{1}{2}^n$ (n is a number of electrodes 4, 5 and 6), eight tones can be displayed by selecting combination of the electrodes 4, 5 and 6. The examples of the selection of the electrodes 4, 5 and 6 are shown in FIGS. 4(a) to 4(h) in which dotted portions represent transparent state of liquid crystal. FIG. 4(a) shows a state where binary signals "0", "0" and "0" are applied to the electrodes 4, 5 and 6, that is, a state of black. FIG. 4(c) shows a state where binary signals "1", "0" and "0" are respectively applied to the widest electrode 4, the middle width electrode 5 and the narrowest electrode 6, that is, a gray state. FIG. 4(f) shows a state where binary signals "0", "1" and "1" are respectively applied to the electrodes 4, 5 and 6, that is, a gray state which is a little darker than FIG. 4(c). FIG. 4(h) shows a state where binary signals "1", "1" and "1" are respectively applied to the electrodes 4, 5 and 6, that is, a white state. The remaining FIGS. 4(b), 4(d), 4(e) and 4(g) similarly represent various tones. In this manner, eight tones can be produced by changing widths of three electrodes to which signal voltages are applied. Increased number of tones may be similarly produced by increasing electrodes having different widths in a pixel and selecting them.

Figure 5:
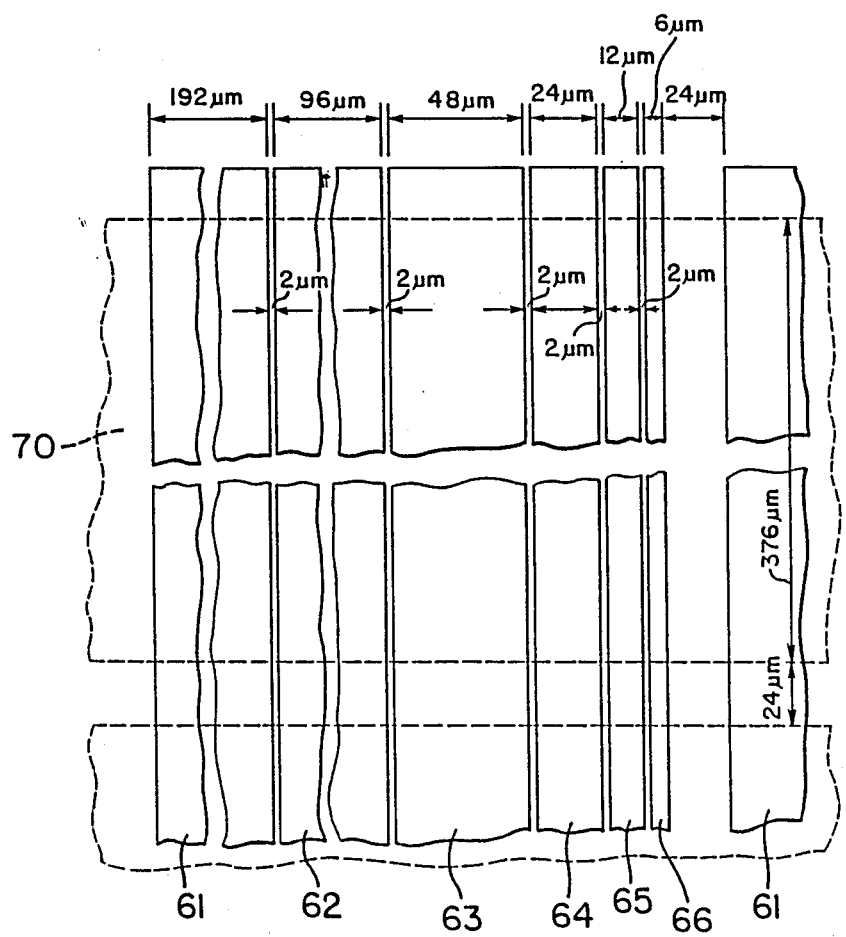
FIG. 5 is a part of liquid crystal display device according to a second embodiment of the present invention.

A second embodiment of the present invention has a horizontal scanning set of six electrodes 61 to 66 in a pixel, as shown in FIG. 5. The electrodes 61 to 66 are elongated in parallel with each other. A plurality of vertical scanning electrodes 70 are disposed in parallel with each other to perpendicularly cross the electrodes 61 to 66. The structure other than the number of electrodes in the horizontal scanning set and numbers of vertical scanning electrodes and horizontal scanning sets is similar to the first embodiment. The display areas is 12 inches size and a number of pixels are 640×400 with 640 horizontal scanning sets and 400 vertical scanning electrodes.

The vertical scanning electrodes 70 respectively have a width of 376 $\mu$m and are separated from adjacent one with an interval of 24 $\mu$m. Width of the horizontal scanning set of electrodes 61 to 66 is 388 $\mu$m and separated from adjacent set with an interval of 24 $\mu$m. The widths of the electrodes 61 to 66 are respectively 192 $\mu$m, 96 $\mu$m, 48 $\mu$m, 24 $\mu$m, 12 $\mu$m and 6 $\mu$m which are respectively about $\frac{1}{2}$, $\frac{1}{4}$, $\frac{1}{8}$, 1/16, 1/32 and 1/64 of the width of the horizontal scanning set.

The vertical and horizontal scanning circuits are formed with polycrystalline silicon thin film transistors on a glass substrate together with the pixels. The vertical scanning circuit is a shift-register. The horizontal scanning circuit is similar to that shown in FIG. 3. The writing of black and white states are achieved similarly to the first embodiments by two field scannings. The display image can have 64 tones.

According to this second embodiment, the display has a contrast ratio of 1:10 and does not have view angle dependency. The displaying quality is sufficient for being used as a terminal display in a data processing system. Processed output can be quickly displayed as compared to the conventional liquid crystal display device using twisted-nematic type liquid crystal. Picture can be clearly displayed with 64 tones. Those features of quick response and multi-tone image enable the display of this embodiment to be used as the TV display showing moving pictures.

As explained hereinbefore, the present invention can display multi-tone images with using any kind of liquid crystal. If ferroelectric liquid crystal which represents only two states of transparency is used, the multi-tone image or moving image can be clearly displayed with a little response time. Color image may be also displayed with color filters provided on the upper glass cover.

What is claimed is:
1. A liquid crystal display device comprising:
a first transparent substrate having an upper surface;
a first electrode formed on said upper surface of said first transparent substrate;
a second transparent substrate having a bottom surface;
a set of second electrodes formed on said bottom surface of said second transparent substrate in parallel with each other to face said first electrode, said set of second electrodes composing of N-electrodes having different widths, wherein N is an integer of plural number;
a liquid crystal interposed between said first and second transparent substrate through said first and second electrodes;
an analog-digital converter converting an analog input signal to a digital signal having bits corresponding to said N, said digital signal of said bits having a combination of first and second constant voltages presenting an analog value of said analog input signal; and a means connected to said analog-digital converter for applying said digital signal between said first electrode and said set of said second electrodes at a time to display a figure by changing orientation of said liquid crystal.

2. A liquid crystal display device as claimed in claim 1, wherein said first electrode and said set of second electrodes form a pixel, said display device having a plurality of pixels arranged in a matrix form, and said matrix being formed by a plurality of said first electrodes arranged on said upper surface of said first transparent substrate elongated and in parallel with each other and a plurality of sets of said second electrodes arranged on said bottom surface of said second transparent substrate elongated and in parallel with each other so as to cross said plurality of first electrodes.

3. A liquid crystal display device as claimed in claim 2, wherein said second electrodes in each of said sets have widths of about $\frac{1}{2}, \frac{1}{2}^2 \ldots, \frac{1}{2}^N$ of a width of said each of said respective sets of said second electrodes.

4. A liquid crystal display device as claimed in claim 3, wherein said liquid crystal is a ferroelectric liquid crystal.

5. A liquid crystal display device comprising:
a transparent support substrate having an upper surface;
a plurality of vertical electrodes arranged on said upper surface of said support substrate elongated and in parallel with each other;
a transparent cover substrate having a bottom surface;
a plurality of sets of horizontal electrodes arranged on said bottom surface of said cover substrate elongated and in parallel with each other so as to cross said vertical electrodes, each of said sets composing of N-horizontal electrodes having different widths, wherein N is an integer of plural number;
a lower orientation film covering said upper surface of said support substrate and said vertical electrodes;
an upper orientation film covering said bottom surface of said cover substrate and said horizontal electrodes;
a liquid crystal interposed between said lower and upper orientation film;
an analog-to-digital converter converting an analog input signal to a digital signal having bits corresponding to said N, said digital signal of said bits having a combination of first and second constant voltages presenting an analog value of said analog input signal; and
means connected to said analog-digital converter for applying said digital signal between one of said vertical electrodes and one of said sets of horizontal electrodes at a time to display a figure by changing orientation of said liquid crystal.

6. A liquid crystal display device as claimed in claim 5, wherein said liquid crystal is a ferroelectric liquid crystal.

7. A liquid crystal display device as claimed in claim 6, wherein each of said sets of horizontal electrodes has a first width in a direction along said vertical electrodes, respectively, and said horizontal electrodes in each set have second widths which are about $\frac{1}{2}, \frac{1}{4}, \ldots, \frac{1}{2}^N$ of said first width.

* * * * *